United States Patent [19]

Shimamura et al.

[11] Patent Number: 4,698,581
[45] Date of Patent: Oct. 6, 1987

[54] REACTIVE POWER COMPENSATION APPARATUS

[75] Inventors: Takeo Shimamura; Hiroshi Uchino, both of Hachioji; Ryoichi Kurosawa, Kokubunji, all of Japan

[73] Assignee: Kabushiki Kaisha Toshiba, Kawasaki, Japan

[21] Appl. No.: 903,957

[22] Filed: Sep. 5, 1986

[30] Foreign Application Priority Data

Sep. 10, 1985 [JP] Japan .................................. 60-200010
Sep. 10, 1985 [JP] Japan .................................. 60-200012

[51] Int. Cl.$^4$ ............................................. G05F 1/70
[52] U.S. Cl. ................................. 323/211; 323/210; 373/104
[58] Field of Search ................ 323/210, 211; 219/130, 219/33; 373/102, 104

[56] References Cited

U.S. PATENT DOCUMENTS 3,963,978  6/1976  Kelley et al. ......................... 373/104
3,968,422  7/1976  Waldmann ........................... 373/104

FOREIGN PATENT DOCUMENTS 63622     5/1981  Japan .................................. 323/210
3243701   5/1984  Japan .................................. 323/210
59-139416 8/1984  Japan .................................. 323/210

OTHER PUBLICATIONS

The Transaction of the Institute of Electrical Engineers of Japan, vol. 103-B, No. 7, Jul. 1981, Hirofumi Akagi et al.

Primary Examiner—William H. Beha, Jr.
Attorney, Agent, or Firm—Oblon, Fisher, Spivak, McClelland & Maier

[57] ABSTRACT

In a reactive power compensation apparatus for compensating reactive power generated by a load connected to an AC power supply system, dual phase current signals obtained by dual phase-converting the load currents and unit dual phase voltage signals synchronized with voltages of an AC main line connected to the load are used, and arithmetic operations thereof are performed to separately detect an in-phase reactive component signal and opposite phase component signals of the load currents. Current commands are generated on the basis of the separately detected signals, thereby controlling the reactive power compensation apparatus on the basis of the current commands.

10 Claims, 7 Drawing Figures

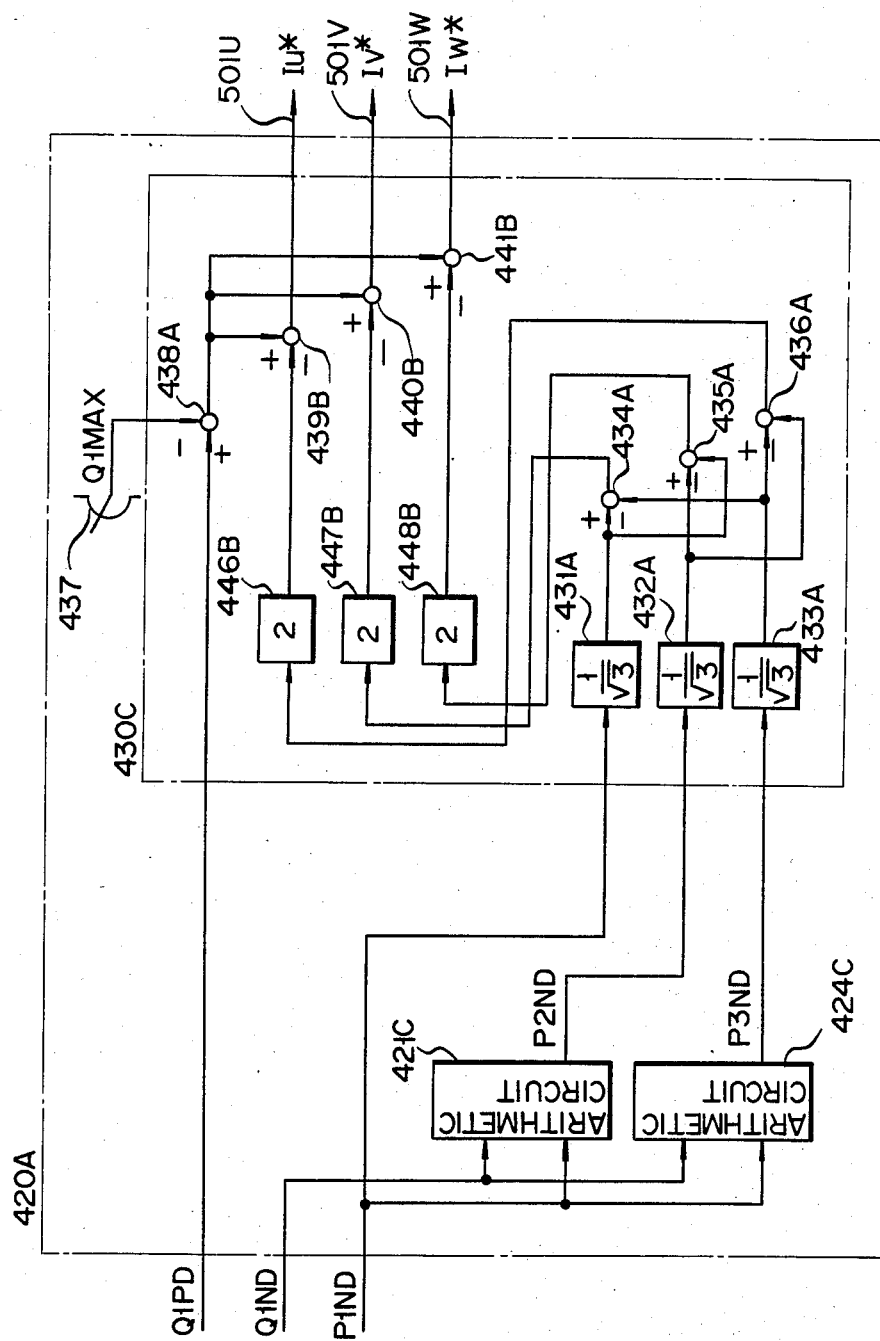
F I G. 5

REACTIVE POWER COMPENSATION APPARATUS

BACKGROUND OF THE INVENTION

The present invention relates to a reactive power compensation apparatus and, more particularly, to a reactive power compensation apparatus for effectively compensating reactive power in a system for supplying power from an AC power supply system through an AC main line to a load subject to great variations in reactive power.

Now a days, large-capacity arc furnace equipment is often connected to and operated by an AC power supply system. Reactive power which abruptly varies according to a state of melt in an arc furnace, is induced at the power supply. The abruptly varying reactive power distorts a voltage waveform in association with an impedance of the power supply system, causing flickering of illumination equipment and degrading the utilization rate of power supply equipment. For this reason, if a large-capacity arc furnace or the like is installed, it is connected in parallel with a reactive power compensation apparatus. The compensation apparatus compensates for the abrupt variations in reactive power generated by the arc furnace.

A conventional reactive power compensation apparatus is described *Power Conversion Techniques for Controlling Reactive Power and Harmonics*, Ed. General Committee of Reactors, Technical Report from the Institute of Electricity (Volume II), No. 76, April, 1979, PP. 26–31. The system configuration of the power supply system is shown in FIG. 1.

Referring to FIG. 1, reference numeral 10 denotes a load such as an arc furnace. Steel scrap or the like is charged in furnace 10 and electrodes 11 are energized to heat and melt the steel scrap or the like. Reference numeral 9 denotes a furnace transformer.

Reactive power compensator 100 has reactor section 300, and phase advance capacitor section 200 serves as a harmonic filter. Reactor section 300 comprises reactors 302U to 302W, anti-parallel-connected thyristors 301U to 301W respectively connected in series with reactors 302U to 302W, load current transformers 81R, 81S, and 81T, voltage detection transformer 70, and its control circuit 350. Control circuit 350 detects the reactive power of furnace 10, and the firing angles of thyristors 301U to 301W are controlled according to the detected reactive power, thereby controlling currents supplied to the reactors. More specifically, compensator 100 cooperates with capacitor section 200, to control currents flowing through reactors 302U to 302W and to generate advanced reactive power equal to delayed reactive power generated by furnace 10. The advanced reactive power appears at lines 51R, 51S, and 51T. Therefore, the reactive power is cancelled at part 4 of a three-phase main line, and only effective power of the load flows through main line 4. The voltage distortion of main line 4 is surpressed, and the utilization efficiency of the power supply equipment can be improved by a degree caused by cancelling of the reactive power. Reference numerals 3 denote system impedances present in the three-phase AC power supply system; and 1, a power supply such as a three-phase AC power supply system or a three-phase main line.

With the above arrangement, accurate detection of the reactive power generated by load 10 in control circuit 350 in compensator 100 is the key to high performance of the apparatus. A typical example of a conventional reactive power detector is disclosed in Japanese Patent Disclosure (Kokai) No. 59-139416. In this circuit, product q of a 90° lagged main line voltage and a load current is calculated. Product q includes a DC component (i.e., a reactive power component) and an AC component oscillating at a frequency twice the fundamental wave frequency. Signal q is filtered through a low-pass filter to detect the DC component thereof (representing the reactive power), and the current supplied to the reactor section is controlled on the basis of the DC component.

Other various reactive power detection methods have been proposed. However, the principle of these methods can be reduced to the one described in Japanese Patent Disclosure No. 59-139416.

The conventional reactive power compensation apparatus has been described. However, the conventional apparatus has the following drawback:

When power variations (including effective and reactive power components) in reactive power generated by an arc furnace are analyzed, these variations include a constant DC component (the in-phase power obtained by the in-phase voltage and current) and a variation component (the opposite phase power caused by the in-phase voltage and the opposite phase current). According to the conventional reactive power detection methods, there is no concept for separating the in-phase power from the opposite phase power. For this reason, the in-phase and opposite phase power components are mixed and the composite component is regarded as a simple variation. The reactor current is controlled by the above composite component. According to the conventional reactive power compensation apparatus, a compensation object is indeterminate. That is, it is impossible to discriminate if the in-phase reactive power (the constant component) or the opposite phase reactive power (the variation component) is controlled. As a result, there is no way to develop power control for higher performance.

A strong demand has recently arisen for improving quality of power in AC power systems. In order to satisfy this demand, a high-performance flicker-preventing reactive power compensation apparatus for an arc furnace or the like and high-quality control for stabilizing a reactive power compensation apparatus for an AC power system are required. For this purpose, a demand has arisen for a reactive power compensation apparatus employing a good power detection method (a method for detecting components including the effective and reactive components) based on a new and improved concept of control.

SUMMARY OF THE INVENTION

It is an object of the present invention to provide a reactive power compensation apparatus for compensating reactive power generated by a load such as an arc furnace, wherein the in-phase and opposite phase components of the load current are separately detected to distinctly control an object of interest, thereby providing compensation control with high accuracy.

In order to achieve the above object of the present invention, there is provided a reactive power compensation apparatus for compensating for reactive power generated by a load connected to an AC power supply system, wherein a dual phase current signal obtained by dual-phase converting a detected load current, and a unit dual phase voltage signal synchronized with an AC main line voltage connected to the load are used, arithmetic operations of these signals are performed to separately detect the in-phase and opposite phase components in the load current, a current command for the reactive power compensation apparatus is generated on the basis of a detection signal, and the reactive power compensation apparatus is controlled on the basis of a current command value.

BRIEF DESCRIPTION OF THE DRAWINGS

FIG. 5 shows another modification of the distributer in FIG. 3;

DETAILED DESCRIPTION OF THE PREFERRED EMBODIMENTS

Preferred embodiments of the present invention will be described with reference to the accompanying drawings hereinafter. A power supply system to which a reactive power compensation apparatus is applicable has been described with reference to FIG. 1, and a detailed description of the same circuit elements as in FIG. 1 will be omitted.

Figure 1:
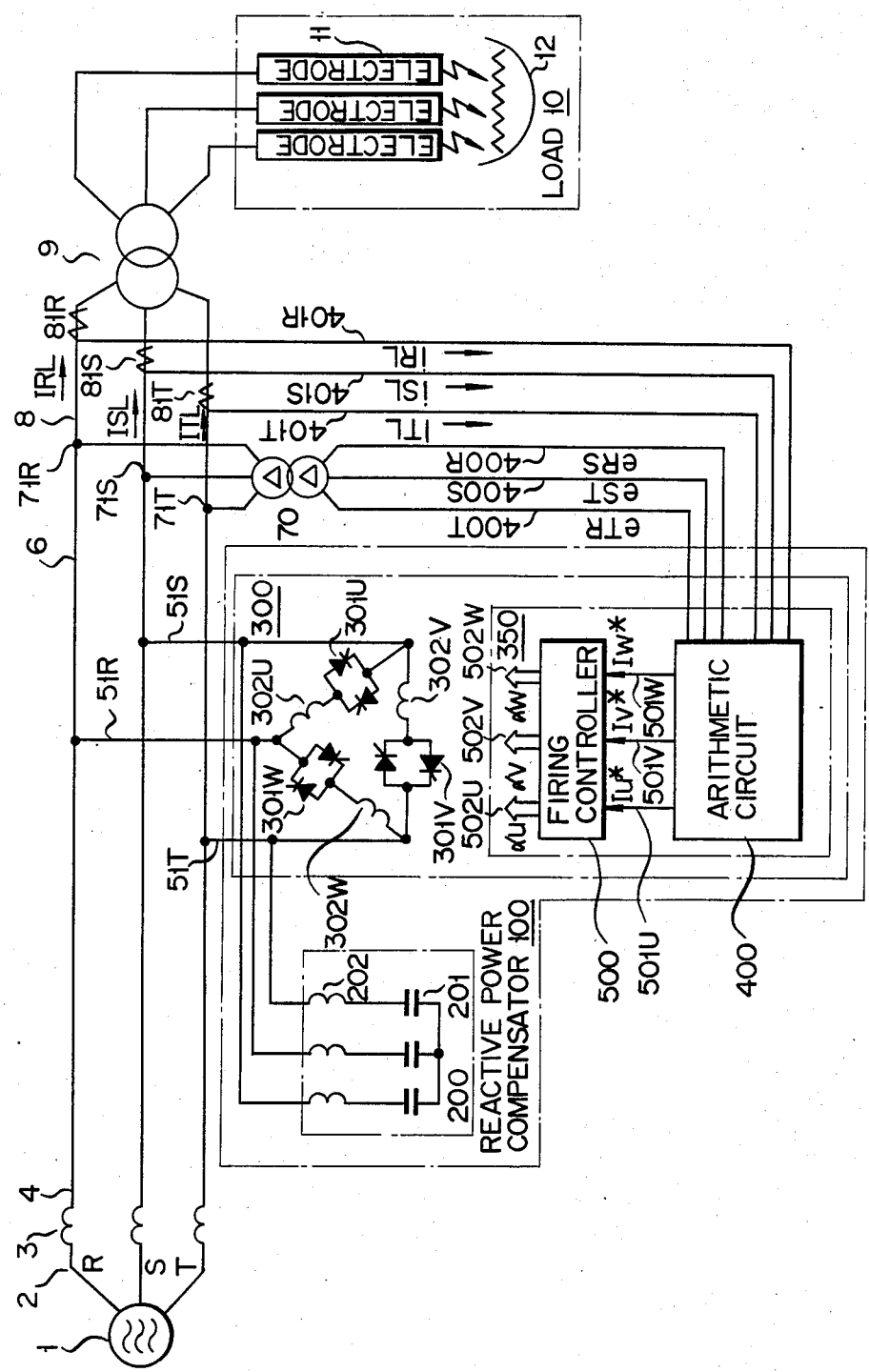
FIG. 1 is a circuit diagram showing the main part of a reactive power compensation apparatus employing the present invention.

Referring to FIG. 1, reference numerals 81R, 81S, and 81T denote current transformers for detecting currents (iRL, iSL, and iTL) in arc furnace 10 and supplying currents iRL, iSL, and iTL to control circuit 350. Reference numeral 70 denotes a potential transformer for detecting voltages (eRS, eST, and eTR) of the main line connected to furnace 10 (including furnace transformer 9) and supplying voltages eRS, eST, and eTR to control circuit 350. In reactor section 300, thyristors 301U to 301W are delta-connected, and the firing angles of thyristors 301U to 301W are controlled to adjust the magnitudes of currents supplied to furnace 12. The reactor currents have distorted waveforms including harmonic components, in addition to the fundamental waveform components.

Arithmetic circuit 400 is one of the main features of the present invention. Arithmetic circuit 400 receives current signals iRL, iSL, and iTL and voltage signals eRS, eST, and eTR, and performs various arithmetic operations. Circuit 400 outputs DC current commands IU*, IV*, and IW* designating the fundamental wave currents supplied to reactor section 300.

Firing controller 500 receives values IU*, IV*, and IW* and controls firing of thyristors 301U, 301V, and 301W, such that reactors 302U, 302V, and 302W supply the currents (the fundamental wave components) designated by values IU*, IV*, and IW*.

Arithmetic circuit 400 and firing controller 500 constitute control circuit 350. A detailed arrangement of circuit 350 is shown in FIG. 2.

An embodiment of the present invention will now be described with reference to FIGS. 2 and 3. In this embodiment, reactor section 300 has delta-connected reactors. The same reference numerals as in FIG. 1 denote the same parts in FIG. 2.

Figure 2:
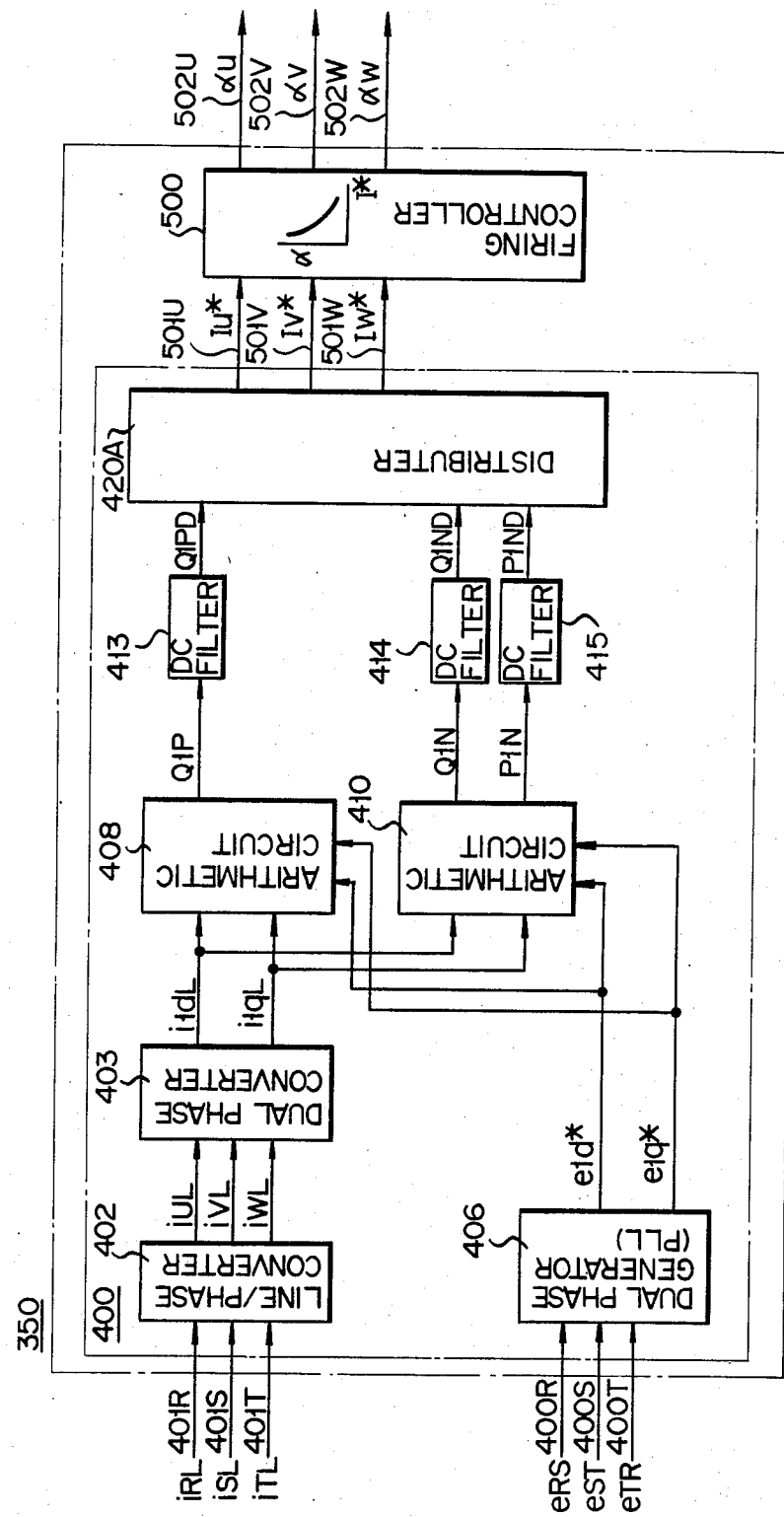
FIG. 2 is a block diagram of an embodiment of the present invention which is applicable to the apparatus in FIG. 1.

Referring to FIG. 2, reference numeral 402 denotes a line/phase converter. Converter 402 converts load current signals iRL, iSL, and iTL detected as line currents in FIG. 1 into phase currents iUL, iSL, and iTL of the delta-connected reactors according to equations (1) below (the arithmetic operations by equations (1) are required for the delta-connected reactors and are not required for the star-connected reactors):

$$\left. \begin{array}{l} iUL = (1/\sqrt{3})(iRL - iSL) \\ iVL = (1/\sqrt{3})(iSL - iTL) \\ iWL = (1/\sqrt{3})(iTL - iRL) \end{array} \right\} \quad (1)$$

Dual phase converter 403 converts current signals iUL, iVL, and iWL into dual phase current signals i1dL and i1qL according to equations (2) below:

$$\left. \begin{array}{l} i1dL = \sqrt{2/3}\ \{iUL - (iVL + iWL)/2\} \\ i1qL = \sqrt{2/3}\ \{\sqrt{3}/2(iVL - iWL)\} \end{array} \right\} \quad (2)$$

Dual phase generator 406 comprises a phase locked loop circuit (PLL circuit) for receiving AC main line voltage signals eRS, eST, and eTR in FIG. 1. If the first, second, and third phases are defined as the R, S, and T phases in FIG. 1, PLL circuit 406 generates unit sinusoidal signal e1d1* synchronized with interline voltage eRS between the first and second phases, unit sinusoidal signal e1q1* lagged by 90° from signal e1d1*, and phase signal θ1d1* of signal e1d1*. Signals e1d1* and e1q1* are defined by equations (3) (signals e1d1* and e1q1* are synchronized with the first phase voltage signal when reactors in reactor section 300 are starconnected):

$$\left. \begin{array}{l} e1d^* = \cos\theta RS \\ e1q^* = \sin\theta RS \end{array} \right\} \quad (3)$$

Arithmetic circuit 408 receives signals i1dL, i1qL, e1d*, and e1q* and calculates signal Q1p according to equation (4) below:

$$Q1p = e1d^* \cdot i1qL - e1q^* \cdot i1dL \quad (4)$$

If load currents iRL, iSL, and iTL include the in-phase and opposite phase components, signal Q1p is a pulsated signal including a DC component and an AC component oscillating at a frequency twice that of the fundamental wave. The DC component of Q1p represents the in-phase reactive current. DC filter 413 receives the DC component of signal Q1p and outputs it as signal Q1pD. Signal Q1pD is the in-phase reactive current signal.

Arithmetic circuit 410 receives signals i1dL, i1qL, e1d*, and e1q* and calculates signals Q1N and P1N according to equations (5) below:

$$Q1N = e1d^* \cdot i1qL - (-e1q^*) \cdot i1dL$$

$$P1N = eId^* \cdot iIdL + (-eIq^*) \cdot iIqL \Bigg\} \quad (5)$$

If load currents iRL, iSL, and iTL include the in-phase and opposite phase components, Q1p and P1N are pulsated signals. Signals Q1p and P1N are filtered through DC filters 414 and 415 to detect DC component signals Q1ND and P1ND, respectively. The resultant signals Q1ND and P1ND represent component currents obtained when the opposite phase current included in first phase current iUL in equation (1) is separated into a component (P1ND) having the same phase as that of the interline voltage of the first and second phases and a component (Q1ND) phase-shifted by 90° therefrom. P1ND is referred to as an in-phase opposite phase current signal of the first phase, and Q1ND is referred to as a 90° opposite phase current signal of the first phase.

Distributer 420A receives signals Q1PD, Q1ND, and P1ND and performs arithmetic operations to output current command values IU*, IV*, and IW* for designating currents supplied to reactor section 300 in FIG. 1 (The arrangement and operation of distributer 420A will be described in detail later with reference to FIG. 3).

Firing controller 500 receives values IU*, IV*, and IW* and controls firing of thyristors 301U, 301V, and 301W in section 300 to which currents (fundamental wave components) designated by IU*, IV*, and IW* are supplied.

The contents of distributer 420A will now be described with reference to FIG. 3. The same reference numerals as in FIG. 2 denote the same parts in FIG. 3.

Figure 3:
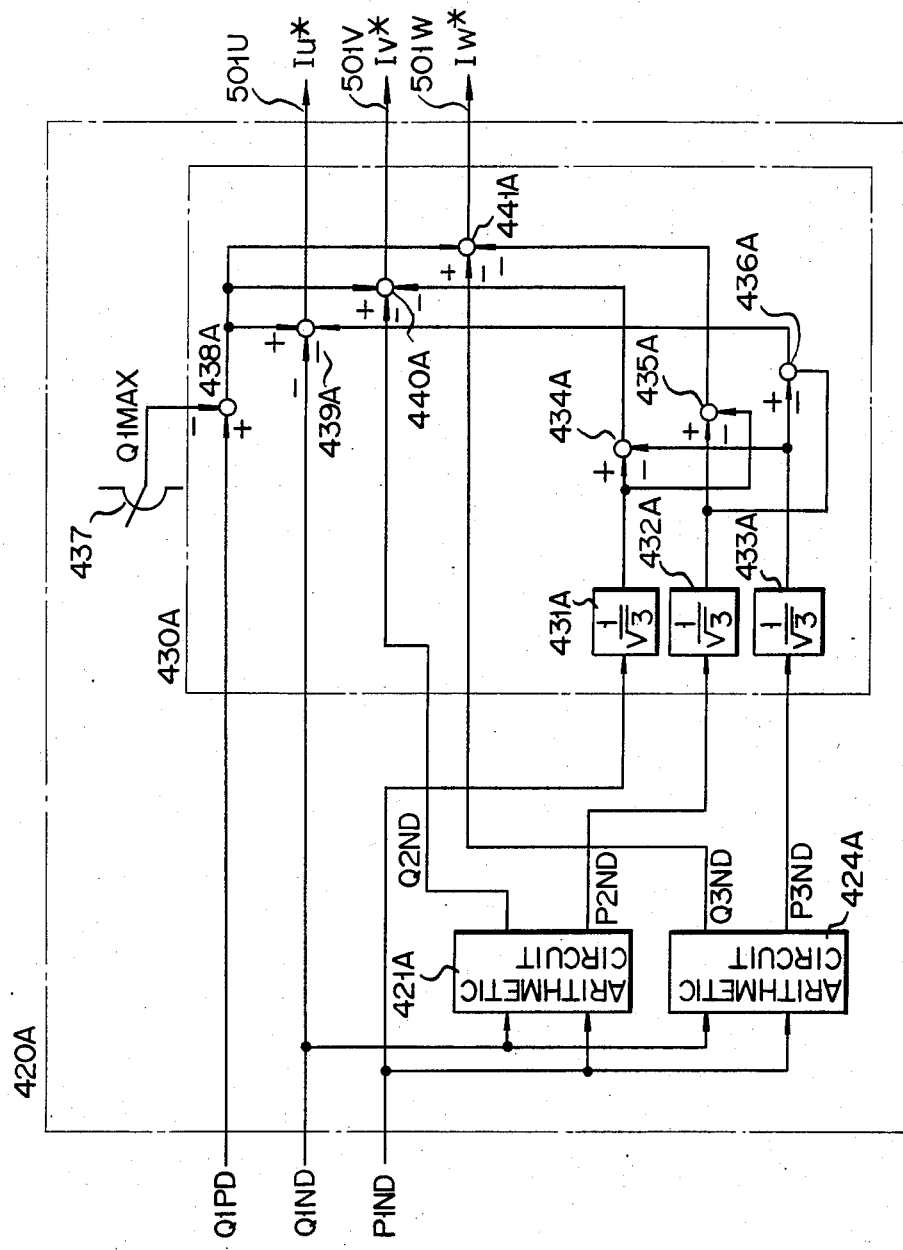
FIG. 3 is a block diagram showing an internal arrangement of distributer 420A in FIG. 2.

Referring to FIG. 3, reference numerals 421A and 424A denote arithmetic circuits. Circuits 421A and 424A receive signals Q1ND and P1ND and perform arithmetic operations according to equations (6) and (7), to output 90° opposite phase current signal Q2ND of the second phase, in-phase opposite phase current signal P2ND of the second phase, and in-phase opposite phase current signal P3ND of the third phase:

$$\left. \begin{array}{l} Q2ND = P1ND \cdot \sin(2\pi/3) + Q1ND \cdot \cos(2\pi/3) \\ P2ND = P1ND \cdot \cos(2\pi/3) - Q1ND \cdot \sin(2\pi/3) \end{array} \right\} \quad (6)$$

$$\left. \begin{array}{l} Q3ND = -P1ND \cdot \sin(2\pi/3) + Q1ND \cdot \cos(2\pi/3) \\ P3ND = P1ND \cdot \cos(2\pi/3) + Q1ND \cdot \sin(2\pi/3) \end{array} \right\} \quad (7)$$

Signals P2ND and Q2ND respectively represent the in-phase component current (P2ND) and 90° phase-shifted current component (Q2ND) when the opposite phase component of second phase current iVL in equation (1) is separated into a component having the same phase as that of the interline voltage of the second and third phases and a 90° phase-shifted component.

Similarly, signals P3ND and Q3ND respectively represent an in-phase component current (P3ND) and a 90° phase-shifted current component (Q3ND) when the opposite phase component of third phase current iWL in equation (1) is separated into a component having the same phase as that of the interline voltage of the third and first phases and a 90° phase-shifted component thereof.

Setting circuit 437 outputs reactive current setting signal Q1MAX to designate a maximum value of the reactive current (i.e., a phase lag) generated by reactor section 300 in FIG. 1.

Distributing section 430A receives in-phase reactive current signal Q1PD detected from a load current of an arc furnace or the like, 90° opposite phase current signals Q1ND, Q2ND, and Q3ND of the first, second and third phases, in-phase opposite phase current signals P1ND, P2ND, and P3ND of the first, second, and third phases, and reactive current setting signal Q1MAX and performs arithmetic operations according to equations (8). Section 430A outputs current command IU* of the first phase for designating a current to be generated by reactor 302U in section 300 in FIG. 1. Similarly, section 430A outputs current commands IV* and IW* of the second and third phases for designating currents to be generated by reactors 302V and 302W, respectively. Section 430A is arranged in the following manner:

In section 430A, reference numerals 431A, 432A, and 433A denote coefficient circuits, each of which multiplies an input signal by $1/\sqrt{3}$ and outputs a resultant signal. Reference numerals 434A, 435A, and 436A denote adders for adding outputs from coefficient circuits 431A, 432A, and 433A, in the polarity illustrated in FIG. 3. Outputs from adders 434A, 435A, and 436A correspond to values represented by the third terms in equations (8).

Reference numeral 438A denotes an adder for performing an arithmetic operation (a subtraction) of signals Q1MAX and Q1PD in the illustrated polarity. An output from adder 438A corresponds to each first term in equations (8). Reference numerals 439A, 440A, and 441A denote adders for adding signals Q1ND, Q2ND, and Q3ND, the output signal from adder 438A, and output signals from adders 434A, 435A, and 436A in the illustrated polarity (FIG. 3).

$$\left. \begin{array}{l} IU^* = (-Q1MAX + Q1PD) - Q1ND - (1/\sqrt{3})(P3ND - P2ND) \\ IV^* = (-Q1MAX + Q1PD) - Q2ND - (1/\sqrt{3})(P1ND - P3ND) \\ IW^* = (-Q1MAX + Q1PD) - Q3ND - (1/\sqrt{3})(P2ND - P1ND) \end{array} \right\} \quad (8)$$

Resultant signals IU*, IV*, and IW* are DC signals which include all information on in-phase currents and opposite phase currents. Reactor section 300 in FIG. 1 is controlled according to signals IU*, iV*, and IW*. Even if the load currents from an arc furnace or the like include both in-phase and opposite phase components, currents at parts 4 in FIG. 5 can be arbitrarily balanced.

The above arrangement is a typical configuration of the present invention.

The operation of the embodiment will now be described below.

Currents of the arc furnace are detected as signals iRL, iSL, and iTL, as shown in FIG. 1. These currents are normally unbalanced currents including both in-phase and opposite phase components. Power supply main line voltages connected to the arc furnace are detected as signals eRS, eST, and eTR which are supplied to control circuit 400 in reactive power compensation apparatus 100.

Referring to FIG. 2, dual phase generator 406 receives signals eRS, eST, and eTR and generates dual phase signals e1d* and e1q* according to equations (3). Signals iRL, iSL, and iTL detected as line currents are converted by line/phase converter 402 according to equations (1) into delta-connected phase currents iUL, iVL, and iWL (i.e., currents respectively flowing through delta-connected reactors 302U, 302V and 302W in reactor section 300 in FIG. 1). Signals iUL, iVL, and iWL are converted by dual phase converter 403 according to equations (2) into dual phase signals i1dL and i1qL. Arithmetic circuit 408 performs the arithmetic operation according to equation (4), to obtain signal Q1P. Signal Q1P is filtered by DC filter 413, to extract DC component signal Q1PD.

Extracted signal Q1PD represents the in-phase current included in signals iRL, iSL, and iTL (i.e., UL, iVL, and iWL in equations (1). Arithmetic circuit 410 performs arithmetic operations according to equation (5) to obtain signals P1N and Q1N. Signals P1N and Q1N are filtered by DC filters 415 and 414 to extract DC component signals P1ND and Q1ND, respectively. Signals P1ND and Q1ND represent currents (i.e., the in-phase current component or P1ND, and 90° phase-shifted current component or Q1ND) of components obtained when the opposite phase current included in first phase current iUL in equations (1) is separated into a component having the same phase as that of the interline voltage between the first and second phases and a component phase-shifted by 90° from that of the interline voltage (P1ND is referred to as the in-phase opposite phase current of the first phase, and Q1ND is referred to as the 90° opposite phase current).

Arithmetic operations according to equations (6) and (7) are performed by arithmetic circuits 421A and 424A in distributer 420A, to obtain in-phase opposite phase current P2ND of the second phase, 90° opposite phase current Q2ND of the second phase, in-phase opposite phase current P3ND of the third phase, and 90° opposite phase current Q3ND of the third phase.

Resultant signal Q1PD is a signal associated with only the in-phase current included in load currents iRL, iSL, and iTL. More specifically, it its in-phase current is separated into effective and reactive components, it is associated with only the reactive current. Q1PD is a signal associated with only the in-phase reactive current. Arithmetic operations of the required values concerning the in-phase current components, for example, the conversion in equation (6) or the like, can be performed with reference to any phase, to obtain identical results. Therefore, in-phase arithmetic operations need be performed for only one phase.

Assuming signals P1ND and Q1ND, signals P2ND and Q2ND, and signals P3ND and Q3ND, these signals are associated with only the opposite phase current components included in iUL, iVL, and iWL (i.e., iRL, iSL, and iTL) in equations (1). More specifically, signals P1ND and Q1ND are associated with only the opposite phase of current iUL; P2ND and Q2ND, with the opposite phase of iVL; and P3ND and Q3ND, with the opposite phase of iWL. Assuming P1ND and Q1ND, P1ND is the current component having the same phase as that of the interline voltage in the opposite phase of current iUL, and Q1ND is a signal associated with only the current component having a phase which is shifted by 90° from that of the interline voltage.

As is apparent from the above description, all pieces of information of loading currents iRL, iSL, and iTL are discreetly detected in the forms of DC currents Q1PD, P1ND, P2ND, P3ND, Q1ND, Q2ND, and Q3ND.

The resultant signals are supplied to distributing section 430A in FIG. 3 according to equations (8), to output current commands IU*, IV*, and IW*. As for control of the opposite phase currents, currents of reactor section 300 in FIG. 1 are controlled on the basis of commands IU*, IV*, and IW*. In this case, the phases of the opposite phase currents in the compensation currents generated by section 300 are controlled to cancel the opposite phase currents of the currents generated by the arc furnace. The opposite phase currents from the arc furnace are cancelled by the compensation currents at lines 51R, 51S, and 51T. Therefore, the opposite phase currents do not flow toward power supply 1, thereby balancing the current of power supply 1.

As for the in-phase reactive currents, the output signal from adder 438A in FIG. 3 is used for control. A sum of the in-phase reactive components (lag) of the currents generated by the load and the in-phase reactive components (lag) of the compensation currents generated by reactor section 300, is controlled to be equal to reactive current setting signal Q1MAX (lag) in FIG. 3. The reactive currents having a predetermined time lag are cancelled by the advanced reactive current of phase advance capacitor section 200 in FIG. 1. As a result, the reactive currents do not flow toward AC power supply 1 in FIG. 1. Only the in-phase effective currents generated by the load flow in the AC power supply.

The above description leads to the following facts. Upon operation of the reactive power compensation apparatus in FIG. 2, even if the load such as an arc furnace generates unbalanced currents including the in-phase and opposite phase components, the in-phase and opposite phase components of the reactive currents are compensated for, and only the in-phase effective currents flow in the AC power supply. Therefore, voltage variations (i.e., flickering) can be effectively prevented. In addition, the utilization rate (i.e., the reactive power can be neglected) of the power supply can be greatly improved.

A typical embodiment of the present invention has been described above.

A modification according to the present invention will now be described with reference to FIG. 4.

Figure 4:
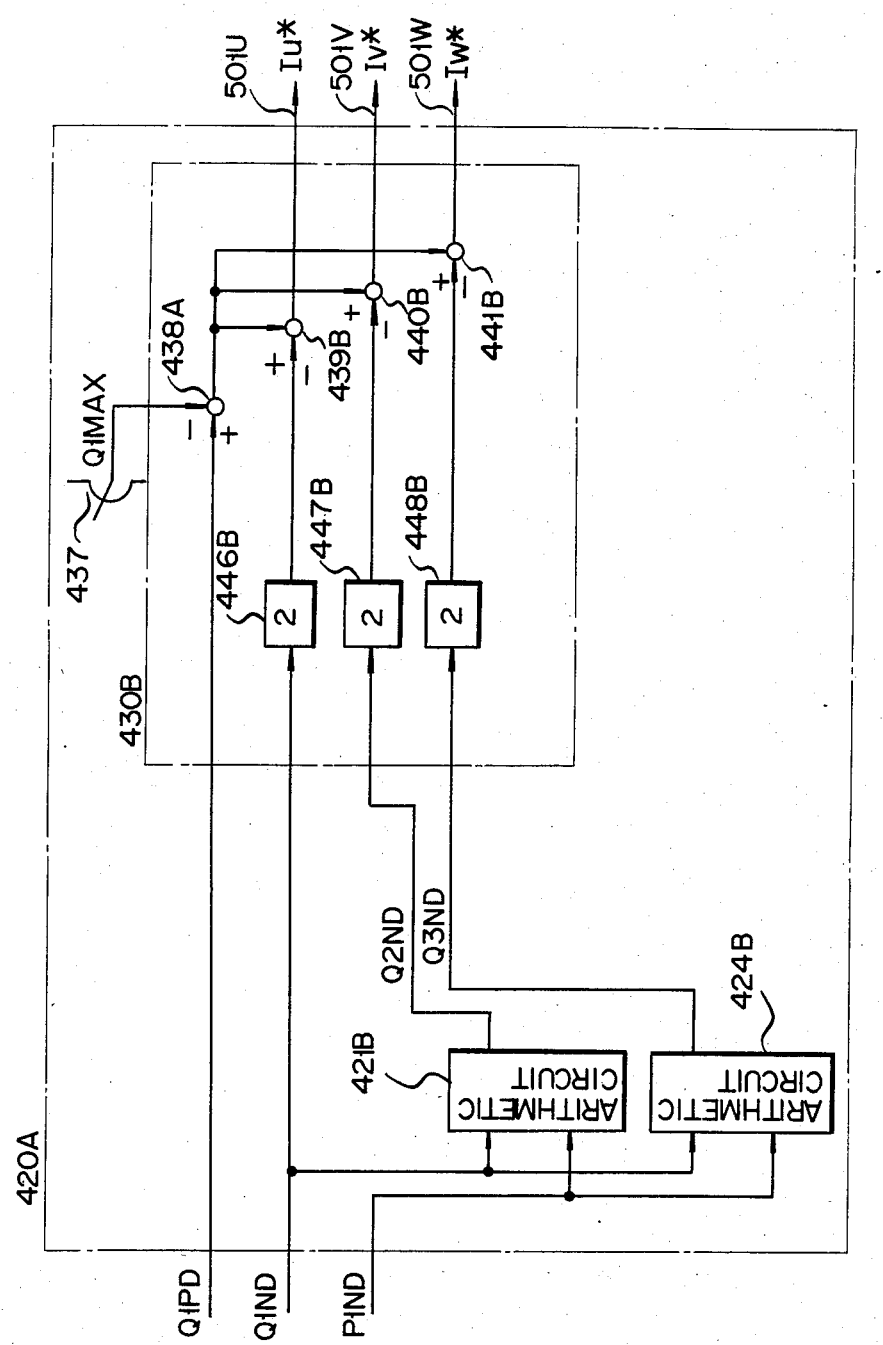
FIG. 4 shows a modification of the distributer in FIG. 3.

FIG. 4 shows a modification of distributer 420A in FIG. 3. The distributer of FIG. 4 is used in place of distributor 420A in FIG. 2. This modification includes the same part as in the previous embodiment, and the same description will therefore be omitted. The same reference numerals as in FIG. 2 denote the same parts in FIG. 4.

Referring to FIG. 4, reference numerals 421B and 424B denote arithmetic circuits. Circuits 421B and 424B respectively receive 90° opposite phase current signal Q1ND of the first phase and in-phase opposite phase curent signal P1ND of the first phase, and perform arithmetic operations according to equations (9) and (10), to output 90° opposite phase current signal Q2ND of the second phase and 90° opposite phase current signal Q3ND of the third phase. Signals Q2ND and Q3ND are the same as those obtained by equations (6) and (7).

Setting circuit 437 outputs reactive current setting signal Q1MAX. Distributing section 430B receives in-phase reactive current signal Q1PD, and 90° opposite phase current signals Q1ND, Q2ND, and Q3ND of the first, second, and third phases, reactive current-setting signal Q1MAX, and performs arithmetic operations according to equations (11), to output current commands IU*, IV*, and IW* of the first, second, and third phases. Reference numerals 446B, 447B, and 448B denote coefficient circuits, each of which doubles the corresponding input signal; and 438A, 439B, 440B, and 441B denote adders for adding input signals in the illustrated polarities in FIG. 4.

$$Q2ND = P1ND \cdot \sin(2\pi/3) + Q1ND \cdot \cos(2\pi/3) \quad (9)$$

$$Q3ND = -P1ND \cdot \sin(2\pi/3) + Q1ND \cdot \cos(2\pi/3) \quad (10)$$

$$\left.\begin{array}{l} IU^* = (-Q1MAX + Q1PD) - 2Q1ND \\ IV^* = (-Q1MAX + Q1PD) - 2Q2ND \\ IW^* = (-Q1MAX + Q1PD) - 2Q3ND \end{array}\right\} \quad (11)$$

Commands IU*, IV*, and IW* obtained in equations (11) are the same as those in equations (8). When the currents of reactor section 300 in FIG. 1 are controlled on the basis of commands IU*, IV*, and IW*, the same compensation effect as in the previous embodiment of FIGS. 2 and 3 can be obtained.

In the modification of FIG. 4, arithmetic operations in arithmetic circuits 421B and 424B can be simpler than those in arithmetic circuits 421A and 424A of FIG. 3.

Another modification of the present invention will now be described with reference to FIG. 5. This modification is the one of the modifications of FIG. 3. The distributer in FIG. 5 serves in place of distributor 420A in FIG. 2. A repetitive description will therefore be omitted.

Referring to FIG. 5, reference numerals 421C and 424C denote arithmetic circuits, respectively. Circuits 421C and 424C respectively receive 90° opposite phase current signal Q1ND of the first phase and, in-phase opposite phase current signal P1ND of the first phase, and perform arithmetic operations according to equations (12) and (13) to output in-phase opposite phase current signal P2ND of the second phase, and in-phase opposite phase current signal P3ND of the third phase. Signals P2ND and P3ND are the same as those obtained by equations (6) and (7).

Reference numeral 437 denotes a setting circuit for outputting reactive current-setting signal Q1MAX; and 430C, a distributing section. Section 430C receives in-phase reactive current signal Q1PD, in-phase opposite phase current signals P1ND, P2ND, and P3ND of the first, second, and third phases, reactive current setting signal Q1MAX, and performs arithmetic operations according to equations (14), to output current commands IU*, IV*, and IW* of the first, second, and third phases. Reference numerals 431A, 432A, and 433A denote coefficient circuits, each of which multiplies the corresponding input signal by $1/\sqrt{3}$. Reference numerals 446B, 447B, and 448B denote coefficient circuits each of which doubles the corresponding input signal.

Reference numerals 438A, 439B, 440B, 441B, 434A, 435A, and 436A denote adders which perform additions at the illustrated polarities in FIG. 5.

$$P2ND = P1ND \cdot \cos(2\pi/3) - Q1ND \cdot \sin(2\pi/3) \quad (12)$$

$$P3ND = P1ND \cdot \cos(2\pi/3) + Q1ND \cdot \sin(2\pi/3) \quad (13)$$

$$\left.\begin{array}{l} IU^* = (-Q1MAX + Q1PD) - (2/\sqrt{3})(P3ND - P2ND) \\ IV^* = (-Q1MAX + Q1PD) - (2/\sqrt{3})(P1ND - P3ND) \\ IW^* = (-Q1MAX + Q1PD) - (2/\sqrt{3})(P2ND - P1ND) \end{array}\right\} \quad (14)$$

Commands IU*, IV*, and IW* in equations (14) are the same as those in equations (8). Therefore, when the currents of reactor section 300 in FIG. 1 are controlled on the basis of these commands, the same compensation effect as in the embodiment of FIGS. 2 and 3 is obtained.

In the modification of FIG. 5, arithmetic operations in arithmetic circuits 421C and 424C can be simpler than those in arithmetic circuits 421A and 424A of FIG. 3.

Another embodiment of the present invention will now be described with reference to FIGS. 6 and 7.

In this embodiment, reactors in reactor section 300 are delta-connected. The same parts as in FIG. 2 denote the same parts in FIG. 6.

Reference numeral 406A denotes a dual phase generator constituted by a phase-locked loop circuit (PLL circuit) for receiving AC main line voltage signals eRS, eST, and eTR. If the first, second, and third phases are the R, S, and T phases, respectively, as shown in FIG. 1, generator 406A outputs unit sinusoidal signal e1d1* synchronized with an interline voltage between the first and second phases, unit sinusoidal signal e1q1* advanced by 90° therefrom, and phase signal θ1d1* thereof. Signals e1d1* and e1q1* are represented by equations 3(A) (signals e1d1* and e1q1* are synchronized with the voltages of the first phase if reactors in reactor section 300 in FIG. 1 are star-connected):

$$\left.\begin{array}{l} e1d1^* = \cos\theta 1d1^* \\ e1q1^* = -\sin\theta ed1^* \end{array}\right\} \quad (3A)$$

Figure 7:
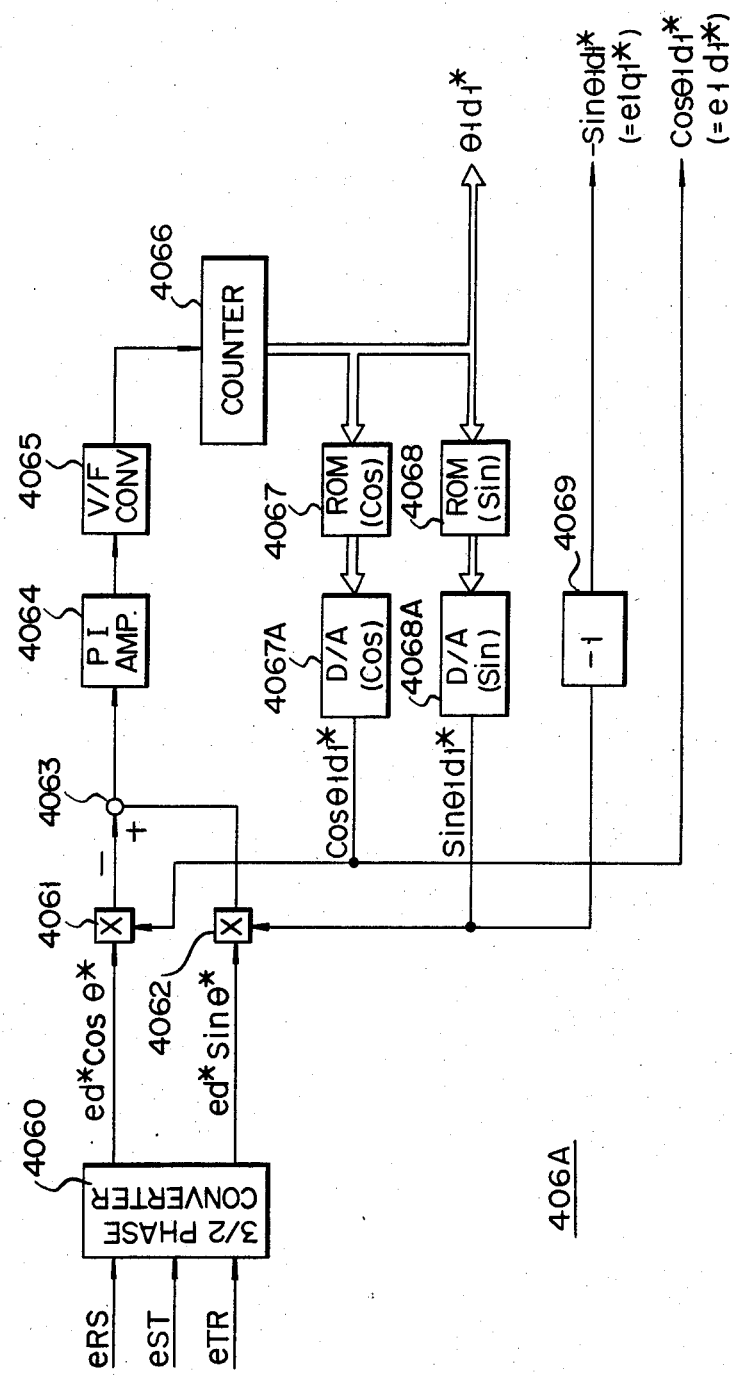
FIG. 7 is a block diagram showing an internal arrangement of dual phase generator 406A in FIG. 6.

Dual phase generator 406A has the internal arrangement shown in FIG. 7. Three-phase voltage signals eRS, eST, and eTR are converted by 3/2 phase converter 4060 into unit cosine signal ed*cosθ* and unit sinusoidal signal ed*sinθ*. Signal ed*cosθ* is multiplied by multiplier 4061, with cosine signal cosθ1d1* from D/A converter 4067A. Signal ed*sinθ* is multiplied by multiplier 4062, with the sinusoidal signal from D/A converter 4068A. Subtracter 4063 calculates a difference between the output (ed*sinθ*sinθ1d1*) from multiplier 4062 and the output (ed*cosθ*cosθ1d1*) from multiplier 4061. The difference output is input to proportional integral (PI) amplifier 4064. A DC output from PI amplifier 4064 is converted by V/F converter 4065 into a signal having a frequency corresponding to the DC output level. This frequency signal is counted by counter 4066, to produce phase signal θ1d1*.

Signal θ1d1* is input as address data, to function ROMs 4067 and 4068. ROM 4067 outputs data corresponding to cosθ1d1* from a memory area at the address corresponding to cosθ1d1*. Data cosθ1d1* is converted by D/A converter 4067A into analog signal cosθ1d1* which is then supplied to multiplier 4061. Similarly, ROM 4068 outputs data corresponding to sinθ1d1* from the memory area at the address corresponding to data θ1d1*. Data sinθ1d1* is converted by D/A converter 4068A into analog signal $\sin\theta 1d1^*$ which is then supplied to multiplier 4062.

The circuit in FIG. 7 constitutes a phase-locked loop, so as to minimize the magnitude of the input to amplifier 4064, thereby obtaining stable phase signal $\theta 1d1^*$.

As is shown in FIG. 7, the output from D/A converter 4068A is inverted by inverting amplifier 4069 to obtain sinusoidal signal $-\sin\theta 1d1^*$.

Reference numeral 407 denotes a dual phase generator for receiving phase angle signal $\theta 1d1^*$, and outputs dual phase voltage signals $e1d2^*$ and $e1q2^*$ each having a frequency twice the AC main line voltage frequency. Signals $e1d2^*$ and $e1q2^*$ are calculated by the following equations, respectively:

$$\left.\begin{array}{l} e1d2^* = \cos 2\theta ed1^* \\ e1q2^* = \sin 2\theta ed1^* \end{array}\right\} \quad (4A)$$

Reference numeral 404 denotes an arithmetic circuit for receiving signals i1dL, i1qL, $e1d1^*$, and $e1q1^*$, and calculating signals Q1N and P1N according to equations (5A) below:

$$\left.\begin{array}{l} Q1N = e1d1^* \cdot i1qL - e1q1^* \cdot i1dL \\ P1N = e1d1^* \cdot i1dL + e1q1^* \cdot i1qL \end{array}\right\} \quad (5A)$$

When load currents iRL, iSL, and iTL include in-phase and opposite phase components, Q1N and P1N are pulsated currents including a DC component and AC components oscillated at a frequency twice the fundamental wave frequency.

Reference numeral 409 denotes a separator. Separator 409 comprises DC filters 410F and 411F, and adders 412F and 413F. Separator 409 receives signals Q1N and P1N and causes filters 410F and 411F to detect the DC components of Q1N and P1N and output them as signals Q1ND and P1ND. Adders 412F and 413 remove the DC components, i.e., Q1ND and P1ND, from signals Q1N and P1N, so that only the AC components are output as signals Q1NA and P1NA. The resultant P1ND and Q1ND represent currents of components obtained when the opposite phase current included in first phase current iUL in equation (1) is separated into a component (i.e., P1ND) having the same phase as that of the interline voltage between the first and second phases and a 90° phase-shifted component therefrom. P1ND is an in-phase opposite phase current signal of the first phase, and Q1ND is a 90° opposite phase current signal of the first phase.

Reference numeral 408A denotes an arithmetic circuit for inputting signals Q1NA, P1NA, $e1d2^*$, and $e1q2^*$ and calculating signal Q1PD according to equation (6A) below:

$$Q1PD = e1d2^* \cdot Q1NA - e1q2^* \cdot P1NA \quad (6A)$$

Signal Q1PD is a DC signal and represents an in-phase reactive current included in each load current iRL, iSL, or iTL.

Reference numeral 420A denotes a distributing section for receiving signals Q1PD, Q1ND, and P1ND, and outputting current commands IU*, IV*, and IW* designating currents flowing through reactor section 300 in FIG. 1. The contents of section 420A can be the same as those in FIG. 3.

Reference numeral 500 denotes a firing controller for receiving current commands IU*, IV*, and IW* and controlling the firing of thyristors 301U, 301V, and 301W so as to flow the currents designated by the commands through reactor section 300.

The above description illustrates a typical arrangement of this embodiment.

The operation of this embodiment will now be described below.

Referring to FIG. 1, currents from an arc furnace are detected as signals iRL, iSL, and iTL. These currents are unbalanced currents including in-phase and opposite phase components. Power supply main line voltage connected to the arc furnace are detected as signals eRS, eST, and eTR which are then supplied to reactive power compensator apparatus 100.

Figure 6:
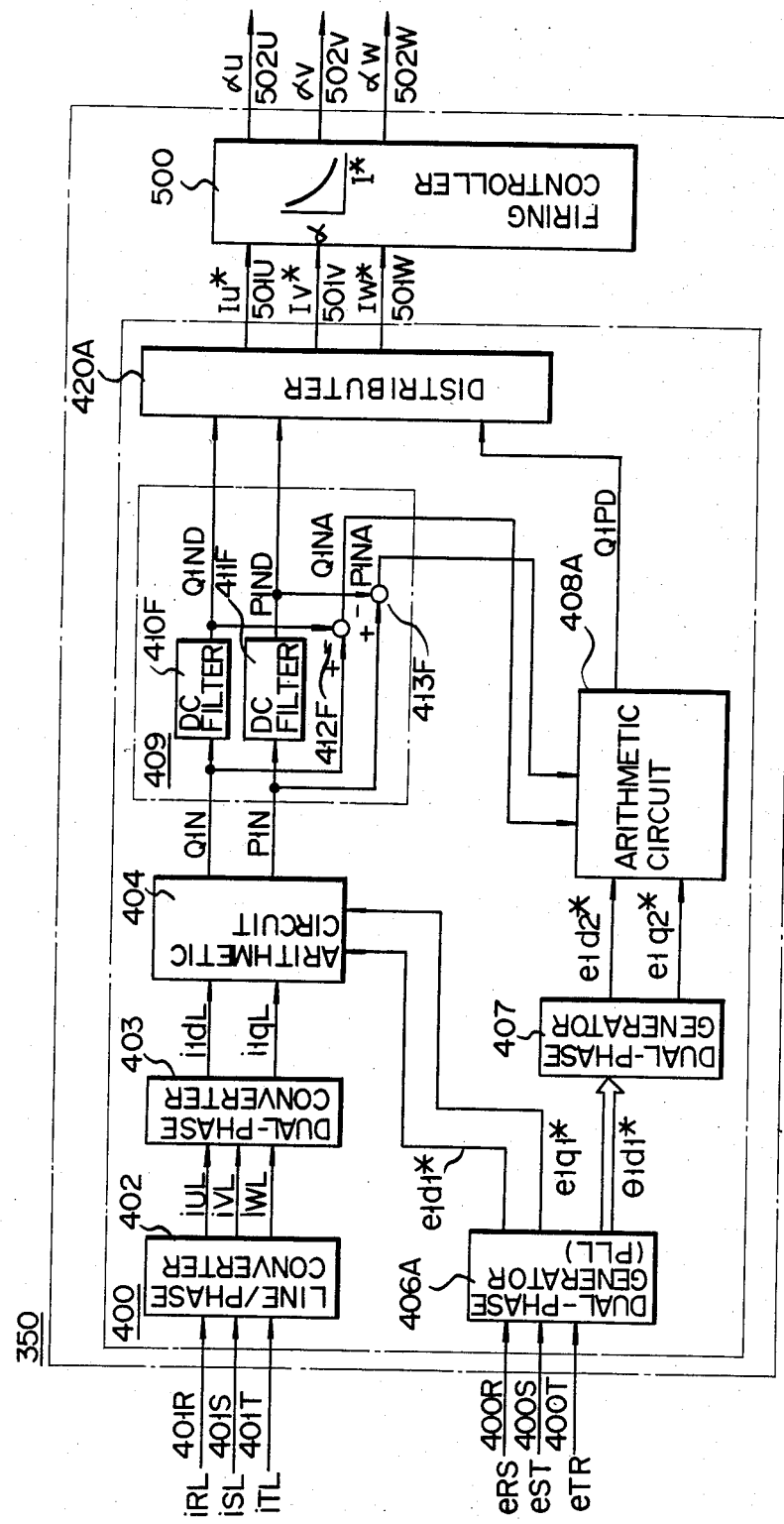
FIG. 6 is a block diagram showing another embodiment of the present invention which is applicable to the apparatus in FIG. 1.

Referring to FIG. 6, dual phase generator 406A receives signals eRS, eST, and eTR, and calculates and outputs dual phase signals $e1d1^*$ and $e1q1^*$ and phase signal $\theta 1d1^*$ of the former phase signal according to equations (3A). Subsequently, dual phase generator 407 receives signal $\theta 1d1^*$ and generates dual signals $e1d2^*$ and $e1q2^*$ according to equations (4A).

On the other hand, signals iRL, iSL, and iTL detected as line currents are converted by line/phase converter 402 according to equations (1), to produce delta-connected phase currents iUL, iVL, and iWL (i.e., currents flowing through reactors 302U, 302V, and 302W if the reactors in section 300 are delta-connected as in FIG. 1). Signals iUL, iVL, and iWL are converted by dual phase converter 403 according to equations (2), thereby producing dual phase signals i1dL and i1qL. Arithmetic circuit 404A performs arithmetic operations according to equations (5A), to produce signals Q1N and P1N. These signals are separated by separator 409 into DC component signals Q1ND and P1ND, and AC component signals Q1NA and P1NA.

Result signals Q1ND and P1ND represent currents (i.e., an in-phase current component or P1ND, and a 90° phase-shifted current component or Q1ND) obtained by separating the opposite phase current included in first phase current iUL into a component having the same phase as that of an interline voltage between the first and second phases and a 90° phase-shifted component (P1ND is referred to as the in-phase opposite phase current of the first phase, and Q1ND is referred to as the 90° opposite phase current of the first phase).

Arithmetic circuit 408A receives signals $e1d2^*$, $e1q2^*$, Q1NA, and P1NA, and performs arithmetic operation according to equation (6A), to obtain DC signal Q1PD. This signal represents an in-phase reactive component current included in signal iRL, iSL, or iTL (or iUL, iVL, or iWL in equations (1)).

Arithmetic operations according to equations (9), (10), (11), (12), and (13) are performed by arithmetic circuits 421A and 424A in distributer 420A to obtain in-phase opposite phase current P2ND of the second phase, 90° opposite phase current Q2ND of the second phase, in-phase opposite phase current P3ND of the third phase, and 90° opposite phase current Q3ND of the third phase.

Resultant signal Q1PD is a signal associated with only the in-phase current included in load currents iRL, iSL, and iTL. More specifically, if its in-phase current is separated into effective and reactive components, it is associated with only the reactive current. Thus, Q1PD is a signal associated with only the in-phase reactive current. Arithmetic operations of the required values concerning the in-phase current components, e.g., conversion in equation (6A) or the like, can be performed with reference to any phase, to obtain identical results. Therefore, in-phase arithmetic operations need be performed for only one phase.

Assuming signals P1ND and Q1ND, signals P2ND and Q2ND, and signals P3ND and Q3ND, these signals are associated with only the opposite phase current components included in iUL, iVL, and iWL (i.e., iRL, iSL, and iTL) in equations (1). More specifically, signals P1ND and Q1ND are associated with only the opposite phase of current iUL; P2ND and Q2ND, the opposite phase of iVL; and P3ND and Q3ND, the opposite phase of iWL. Assuming P1ND and Q1ND, P1ND is the current component having the same phase as that of the interline voltage in the opposite phase of current iUL, and Q1ND is a signal associated with only the current component having a phase which is shifted by 90° from that of the interline voltage.

As is apparent from the above description, all pieces of information of loading currents iRL, iSL, and iTL are discretely detected in the forms of DC currents Q1PD, P1ND, P2ND, P3ND, Q1ND, Q2ND, and Q3ND.

The resultant signals are supplied to distributing section 430A in FIG. 3 according to equations (8), to output current commands IU*, IV*, and IW*. As for control of the opposite phase current, currents of reactor section 300 in FIG. 1 are controlled on the basis of commands IU*, IV*, and IW*. In this case, the phases of the opposite phase currents in the compensation currents generated by section 300 are controlled to cancel the opposite phase currents of the currents generated by the arc furnace. The opposite phase currents from the arc furnace are cancelled by the compensation currents at lines 51R, 51S, and 51T. Therefore, the opposite phase currents do not flow toward power supply 1, thereby balancing the current of power supply 1.

As for the in-phase reactive currents, an output signal from adder 438A in FIG. 3 is used for control. A sum of the in-phase reactive components (lag) of the currents generated by the load and the in-phase reactive components (lag) of the compensation currents generated by reactor section 300 is controlled to be equal to reactive current setting signal Q1MAX (lag) in FIG. 3. The reactive currents having a predetermined time lag are cancelled by the advanced reactive current of phase advance capacitor section 200 in FIG. 1. As a result, the reactive currents do not flow toward AC power supply 1 in FIG. 1. Only the in-phase effective currents generated by the load flow in the AC power supply.

The above description leads to the following facts. Upon operation of the reactive power compensation apparatus in FIG. 6, even if the load such as an arc furnace generates unbalanced currents including the in-phase and opposite phase components, the in-phase and opposite phase components of the reactive currents are compensated for, and only the in-phase effective currents flow in the AC power supply. Therefore, voltage variations (i.e., flickering) can be effectively prevented. In addition, the utilization rate (i.e., the reactive power can be neglected) of the power supply can be greatly improved.

As is apparent from the above description, the reactive power compensation apparatus provides the following effects:

(1) Although the currents generated by a variable load such as an arc furnace are unbalanced currents including in-phase components as well as many opposite phase components, the in-phase components can be clearly distinguished from the opposite phase components. Therefore, an object to be compensated by the reactive power compensation apparatus becomes clear. More specifically, a control system for controlling only in-phase reactive power, a control system for controlling only opposite phase currents, or a control system for compensating in-phase reactive power only if the apparatus has an extra capacity during balancing control (opposite phase current compensation) of the currents may be arbitrarily arranged. Therefore, compensation control of higher performance than conventional apparatuses can be easily realized.

(2) Even if load currents vary, in-phase or opposite phase components can be continuously detected in the form of DC signals regardless of advance/delay power factors. Therefore, discrete control can be eliminated to achieve stable compensation control.

(3) When in-phase or opposite phase components of the load currents are detected by the control circuit, simple elements such as coefficient circuits, adders, and multipliers are used to perform simple arithmetic operations, thereby obtaining desired signals. In this sense, unknown components can be eliminated from the detection signals to obtain accurate signals (concerning the in-phase and the opposite phase) with high precision. In addition, the simple circuit arrangement reduces the fabrication cost.

(4) The reactive power compensation apparatus according to the present invention accurately separates and detects information associated with the in-phase and opposite phase currents. Even if a load (e.g., an arc furnace) subjected to abrupt variations is used, the object to be compensated (i.e., the object is the in-phase or opposite phase current) can be clearly identified to achieve stable reactive power compensation with high precision.

In the reactive power compensation apparatus according to the present invention as described above, an entirely new concept of separating the in-phase components from the opposite phase components and of performing compensation control on the basis of the detection outputs is adapted unlike in the conventional reactive power compensation apparatus. Therefore, future requirements for complicated and sophisticated reactive power compensation control can be sufficiently satisfied.

What is claimed is:

1. A reaction power compensation apparatus for compensating for reactive power generated by a load connected to a AC main line of an AC power supply system, comprising:

line/phase converter means for dual-converting load currents of said load into dual phase current signals;

dual phase generator means for generating unit dual phase voltage signals from AC main line voltages of the AC main line connected to said load, said unit dual phase voltage signals being synchronized with the AC main line voltages;

first means, coupled to said line/phase converter means and to said dual phase generator means, for performing predetermined arithmetic operations on said dual phase current signals and said unit dual phase voltage signals, so that an in-phase reactive component signal and opposite phase component signals of said load currents are separately detected; and second means, coupled to said first means, for producing current commands based on said separately-detected in-phase and opposite phase signals, said current commands serving to control said reactive power compensation apparatus.

2. A reactive power compensation system according to claim 1, comprising:
reactor means coupled to said AC main line for generating advanced reactive power on the AC main line, including plural reactors each connected to respective switching elements which control current through the respective reactors; and
firing control means having said current commands coupled thereto for controlling currents supplied to said reactors based on said current commands.

3. A reactive power compensation apparatus for compensating for reactive power generated by a load connected to a multiphase AC power supply system, comprising:
(a) means for generating a unit sinusoidal wave signal e1d* synchronized with a first phase of an N-phase (N>2) AC power supply system, and generating a 90° phase-lagged unit sinusoidal wave signal e1q*;
(b) means for detecting N-phase load currents i1L, i2L, . . . , iNL flowing through said load, and performing dual phase conversion such that a d-axis of the dual phase conversion, which is associated with d- and q-axes, matches a voltage of the first phase of said N-phase AC power supply system to generate dual phase current signals i1dL and i1qL;
(c) means for performing the following arithmetic operations, using said signals e1d*, e1q*, i1dL, and i1qL:

$Q1P = e1d^* \cdot i1qL - e1q^* \cdot i1dL$ $P1N = e1d^* \cdot i1dL - e1q^* \cdot i1qL$ $Q1N = e1d^* \cdot i1qL + e1q^* \cdot i1dL$ and obtaining signals Q1P, P1N, and Q1N;
(d) means for producing a signal Q1PD representing a DC component of said signal Q1P;
(e) means for producing signal P1ND and Q1ND by detecting DC components of said signals P1N and Q1N; and
(f) current command generating means, responsive to said signals Q1PD, P1ND, and Q1ND, for performing arithmetic operations on said signals Q1PD, P1ND and Q1ND to generate first- to Nth-phase current commands of the N-phase AC, said reactive power compensation apparatus being controlled on the basis of said current commands generated by said current command generating means.

4. An apparatus according to claim 3, wherein said current command generating means includes:
means for providing a reactive current setting signal Q1MAX which designates a maximum value of reactive power to be compensated by said reactive power compensation apparatus;
means for receiving said signals P1ND and Q1ND, and performing arithmetic operations below:

$P2ND = P1ND \cdot \cos(2\pi/3) - Q1ND \cdot \sin(2\pi/3)$ $Q2ND = P1ND \cdot \sin(2\pi/3) + Q1ND \cdot \cos(2\pi/3)$ $P3ND = P1ND \cdot \cos(2\pi/3) + Q1ND \cdot \sin(2\pi/3)$ $Q3ND = -P1ND \cdot \sin(2\pi/3) + Q1ND \cdot \cos(2\pi/3)$ and obtaining signals P2ND, Q2ND, P3ND, and Q3ND; and
means for receiving said signals Q1MAX, Q1PD, Q1ND, Q2ND, Q3ND, P1ND, P2ND, and P3ND, and performing arithmetic operations below:

$IU^* = -Q1MAX + Q1PD - Q1ND - (P3ND - P2ND)/\sqrt{3}$ $IV^* = -Q1MAX + Q1PD - Q2ND - (P1ND - P3ND)/\sqrt{3}$ $IW^* = -Q1MAX + Q1PD - Q3ND - (P2ND - P1ND)/\sqrt{3}$ and generating three-phase current command signals IU*, IV*, and IW*.

5. An apparatus according to claim 3, wherein said current command generating means includes:
means for providing a reactive current setting signal Q1MAX which designates a maximum value of reactive power to be compensated by said reactive power compensation apparatus;
means for receiving said signals P1ND and Q1ND, and performing arithmetic operations below:

$Q2ND = P1ND \cdot \sin(2\pi/3) + Q1ND \cdot \cos(2\pi/3)$ $Q3ND = -P1ND \cdot \sin(2\pi/3) + Q1ND \cdot \cos(2\pi/3)$ and generating signals Q2ND and Q3ND; and
means for receiving said signals Q1MAX, Q1PD, Q1ND, Q2ND, and Q3ND, and performing arithmetic operations below:

$IU^* = -Q1MAX + Q1PD - 2Q1ND$ $IV^* = -Q1MAX + Q1PD - 2Q2ND$ $IW^* = -Q1MAX + Q1PD - 2Q3ND$ and generating three-phase current command signals IU*, IV*, and IW*.

6. An apparatus according to claim 3, wherein said current command generating means includes:
means for providing a reactive current setting signal Q1MAX which designates a maximum value of reactive power to be compensated by said reactive power compensation apparatus;
means for receiving said signals P1ND and Q1ND, and performing arithmetic operations below:

$P2ND = P1ND \cdot \cos(2\pi/3) - Q1ND \cdot \sin(2\pi/3)$ $P3ND = P1ND \cdot \cos(2\pi/3) + Q1ND \cdot \sin(2\pi/3)$ and generating signals P2ND and P3ND; and
means for receiving said signals Q1MAX, Q1PD, P1ND, P2ND, and P3ND, and performing arithmetic operations below:

$IU^* = -Q1MAX + Q1PD - 2(P3ND - P2ND)/\sqrt{3}$ $IV^* = -Q1MAX + Q1PD - 2(P1ND - P3ND)/\sqrt{3}$ $IW^* = -Q1MAX + Q1PD - 2(P2ND - P1ND)/\sqrt{3}$ and generating three-phase current command signals IU*, IV*, and IW*.

7. A reactive power compensation apparatus for compensating for reactive power generated by a load connected to a multiphase AC power supply source, comprising:
(a) means for generating a unit sinusoidal wave signal e1d1* which is synchronized with a first phase of an N-phase (N>2) AC power supply source and is associated with a variable phase angle signal $\theta 1d1^*$, and generating a 90° phase-advanced unit sinusoidal wave signal e1q1* with respect to said unit sinusoidal wave signal e1d1*;
(b) means for detecting N-phase load currents i1L, i2L, ..., iNL flowing through said load, and performing dual phase conversion such that a d-axis of the dual phase conversion, which is associated with d- and q-axes, matches a voltage of the first phase to generate dual phase current signals i1dL and i1qL;
(c) means, responsive to said signals e1d1*, e1q1*, i1dL, and i1qL, for performing arithmetic operations below:

$$P1N = e1d1^* \cdot i1dL + e1q1^* \cdot i1qL$$

$$Q1N = e1d1^* \cdot i1qL - e1q1^* \cdot i1dL$$

and generating signals P1N and Q1N;
(d) means for producing signals P1NA and Q1NA respectively representing AC components of said signals P1N and Q1N, and producing signals P1ND and Q1ND respectively representing DC components of said signals P1N and Q1N;
(e) means, responsive to said variable phase angle signal $\theta 1d1^*$, for generating a unit sinusoidal wave signal e1d2* whose phase angle varies with $2\theta 1d^*$, and generating a 90° phase-lagged unit sinusoidal wave signal e1q2* with respect to said unit sinusoidal wave signal e1d2*;
(f) means, responsive to said signals e1d2*, e1q2*, P1NA, and Q1NA, for performing an arithmetic operation below:

$$Q1PD = e1d2^* \cdot Q1NA - e1q2^* \cdot P1NA$$

and generating a signal Q1PD; and
(g) current command generating means, responsive to said signals Q1PD, P1ND, and Q1ND, for performing arithmetic operations on said signals Q1PD, P1ND and Q1ND to generate first- to Nth-phase current commands of the N-phase AC, said reactive power compensation apparatus being controlled on the basis of said current commands from said current command generating means.

8. An apparatus according to claim 7, wherein said current command generating means includes:
means for providing a reactive current setting signal Q1MAX which designates a maximum value of reactive power to be compensated by said reactive power compensation apparatus;
means for receiving said signals P1ND and Q1ND, and performing arithmetic operations below:

$$P2ND = P1ND \cdot \cos(2\pi/3) - Q1ND \cdot \sin(2\pi/3)$$

$$Q2ND = P1ND \cdot \sin(2\pi/3) + Q1ND \cdot \cos(2\pi/3)$$

$$P3ND = P1ND \cdot \cos(2\pi/3) + Q1ND \cdot \sin(2\pi/3)$$

$$Q3ND = -P1ND \cdot \sin(2\pi/3) + Q1ND \cdot \cos(2\pi/3)$$

and obtaining signals P2ND, Q2ND, P3ND, and Q3ND; and
means for receiving said signals Q1MAX, Q1PD, Q1ND, Q2ND, Q3ND, P1ND, P2ND, and P3ND, and performing arithmetic operations below:

$$IU^* = -Q1MAX + Q1PD - Q1ND - (P3ND - P2ND)/\sqrt{3}$$

$$IV^* = -Q1MAX + Q1PD - Q2ND - (P1ND - P3ND)/\sqrt{3}$$

$$IW^* = -Q1MAX + Q1PD - Q3ND - (P2ND - P1ND)/\sqrt{3}$$

and generating three-phase current command signals IU*, IV*, and IW*.

9. An apparatus according to claim 7, wherein said current command generating means includes
means for providing a reactive current setting signal Q1MAX which designates a maximum value of reactive power to be compensated by said reactive power compensation apparatus;
means for receiving said signals P1ND and Q1ND, and performing arithmetic operations below:

$$Q2ND = P1ND \cdot \sin(2\pi/3) + Q1ND \cdot \cos(2\pi/3)$$

$$Q3ND = -P1ND \cdot \sin(2\pi/3) + Q1ND \cdot \cos(2\pi/3)$$

and generating signals Q2ND and Q3ND; and
means for receiving said signals Q1MAX, Q1PD, Q1ND, Q2ND, and Q3ND, and performing arithmetic operations below:

$$IU^* = -Q1MAX + Q1PD - 2Q1ND$$

$$IV^* = -Q1MAX + Q1PD - 2Q2ND$$

$$IW^* = -Q1MAX + Q1PD - 2Q3ND$$

and generating three-phase current command signals IU*, IV*, and IW*.

10. An apparatus according to claim 5, wherein said current command generating means includes:
means for providing a reactive current setting signal Q1MAX which designates a maximum value of reactive power to be compensated by said reactive power compensation apparatus;
means for receiving said signals P1ND and Q1ND, and performing arithmetic operations below:

$$P2ND = P1ND \cdot \cos(2\pi/3) - Q1ND \cdot \sin(2\pi/3)$$

$$P3ND = P1ND \cdot \cos(2\pi/3) + Q1ND \cdot \sin(2\pi/3)$$

and generating signals P2ND and P3ND; and
means for receiving said signals Q1MAX, Q1PD, P1ND, P2ND, and P3ND, and performing arithmetic operations below:

$$IU^* = -Q1MAX + Q1PD - 2(P3ND - P2ND)/\sqrt{3}$$

$$IV^* = -Q1MAX + Q1PD - 2(P1ND - P3ND)/\sqrt{3}$$

$$IW^* = -Q1MAX + Q1PD - 2(P2ND - P1ND)/\sqrt{3}$$

and generating three-phase current command signals IU*, IV*, and IW*.

* * * * *